United States Patent [19]

Udvardi-Lakos

[11] 4,195,233
[45] Mar. 25, 1980

[54] INVERTER STARTING SYSTEM

[75] Inventor: Janos Udvardi-Lakos, Erlangen, Fed. Rep. of Germany

[73] Assignee: Siemens Aktiengesellschaft, Munich, Fed. Rep. of Germany

[21] Appl. No.: 872,834

[22] Filed: Jan. 27, 1978

[30] Foreign Application Priority Data

Feb. 15, 1977 [DE] Fed. Rep. of Germany ....... 2706395

[51] Int. Cl.² .............................................. H02J 9/06
[52] U.S. Cl. ...................................... 307/66; 307/87; 363/49
[58] Field of Search ...................... 307/64, 66, 85, 86, 307/87; 363/49; 365/229

[56] References Cited

U.S. PATENT DOCUMENTS

| | | | |
|---|---|---|---|
| 4,020,360 | 4/1977 | Udvardi-Lakos | 307/66 |
| 4,058,738 | 11/1977 | Udvardi-Lakos | 307/66 |
| 4,087,697 | 4/1978 | Johnson | 307/87 X |

*Primary Examiner*—L. T. Hix
*Assistant Examiner*—James L. Dwyer
*Attorney, Agent, or Firm*—Kenyon & Kenyon

[57] ABSTRACT

For starting a shut down inverter with the correct phase with a likewise shut down control unit, start control logic is provided, which is addressed by a signal imaging the phase of the monitored system voltage. The start control logic contains a memory for the phase of the system at the time of a disturbance. Upon a start command, the control unit is made to deliver firing pulses in such a manner that the output voltage of the inverter begins with the stored phase of the system at the instant of the disturbance. Preferably, the oscillator of the control unit is started with the stored phase.

5 Claims, 4 Drawing Figures

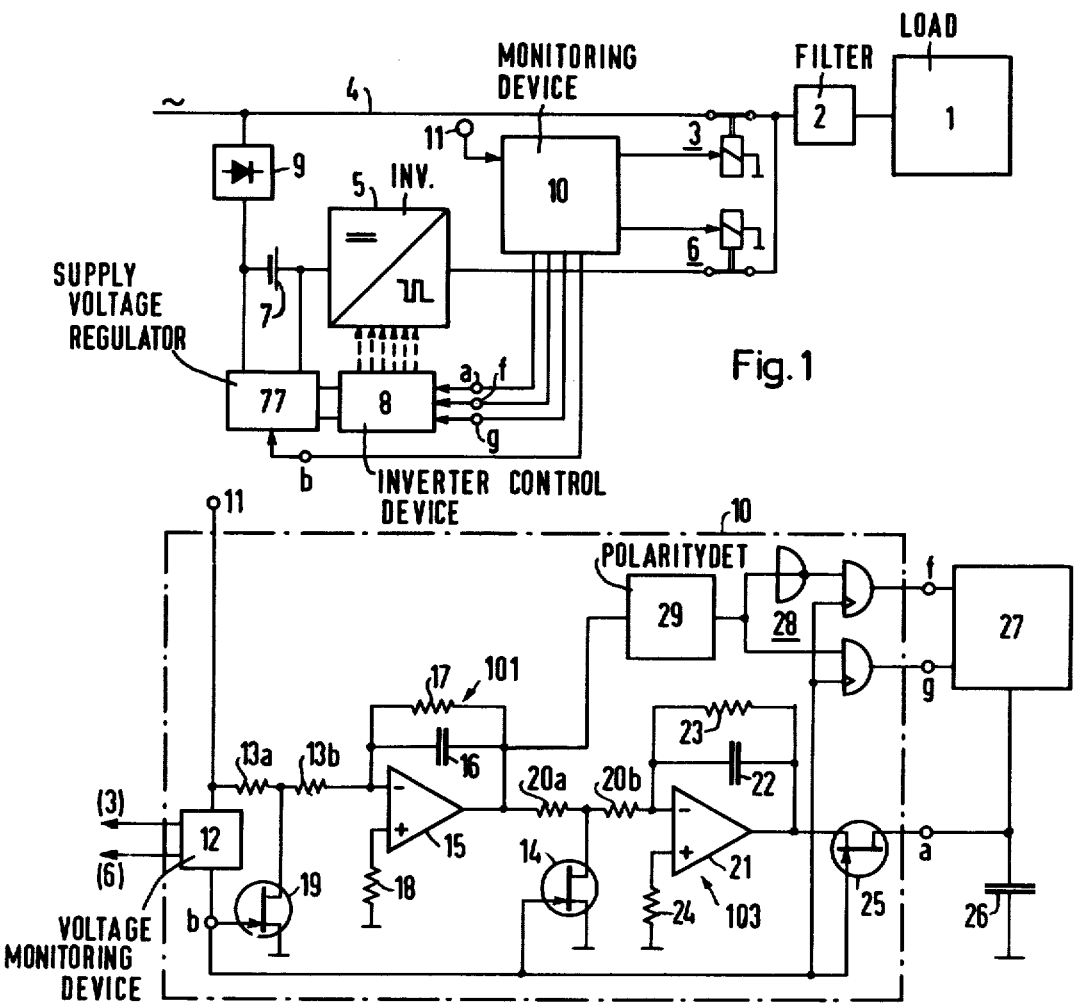

INVERTER STARTING SYSTEM

BACKGROUND OF THE INVENTION

This invention relates to inverters in general and more particularly to a system for starting a shut down inverter.

Inverters for alternating standby and load operation which comprise a power section with controlled main valves and a control arrangement with a control unit for forming firing pulses, and with which a monitoring device for a single or three phase system for forming a start command is associated are used, for instance, in protected power supply systems or for strengthening weak systems or for supplying converter drives.

In protected power supply systems, the inverter can either be operated continuously and uninterrupted, or switched between standby and load operation. In a completely interruption free power supply, the load is supplied continuously by an inverter maintained in continuous operation, which is connected to a single or three phase system via a battery and a charging rectifier. In the event of a system failure, the power supply continues without interruption. The rectifier must be designed for simultaneously charging the battery and supplying the inverter. Because the energy is continuously transformed twice, the efficiency of such interruption free power supplies is unsatisfactory.

In other known protected power supplies, the load is supplied from the system network in normal operation. In the event of a system failure, an inverter is switched to delivering power and the load is switched to the inverter. The charging equipment need be designed only for the charging of the battery. Since no energy transformation takes place in normal operation, the losses are substantially lower than in an immediately ready standby system with a continuously operating inverter. The losses still occurring in normal operation depend on which type of standby operation is chosen for the inverter.

The inverter can be operated "no-load" during standby. Then, its control arrangement is in full operation. The controlled semiconductor valves of the inverter are addressed by firing pulses. The usual commutating processes take place. However, the output voltage of the inverter is disconnected. Due to the commutating processes, losses and noise occur continuously in the power section of the inverter, particularly in transformers and chokes. Further losses accrue in the information processing in the control unit and in generating the firing pulses.

Inverters are also known in which only the control unit is in operation during standby and generates firing control signals. However, the transmission of the firing control signals to the semiconductor valves of the inverter is blocked. Upon a start command, the firing control signals are connected through to the semiconductor valves. No commutation losses accrue in standby operation. The losses due to the continuously operating control unit are small. They can be reduced further if the firing control signals are blocked in standby operation ahead of the pulse output stages of the control unit. Then, only the information processing section in the control unit operates during standby.

SUMMARY OF THE INVENTION

It is an object of the present invention to describe an inverter for alternating standby or load operation which can be switched to load delivery very fast with extremely low losses in standby operation.

According to the present invention, a start control logic operation during standby is provided, which is addressed on the input side by a measuring signal of the monitored network voltage and which contains a memory for at least one parameter of the network voltage at the instant of a disturbance, and which, upon a start command, causes the control unit to deliver firing pulses to the controlled valves of the inverter in such a manner that the output voltage of the inverter begins with the stored parameter of the network voltage at the instant of the disturbance. Phase, amplitude and frequency can be used as stored parameters of the network voltage.

The inverter according to the present invention makes possible an extremely fast start of the operation. During standby, the monitoring device and the start control logic are in operation. The power section, however, is shut down and the electronic control circuitry of the inverter is not connected to its supply voltage. In case of an undue deviation of the monitored network voltage, the electronic control circuitry and the power section of the inverter are brought into operation in such a manner that the output voltage of the inverter begins with the stored parameter of the network voltage at the instant of the disturbance, preferably with the stored phase.

In the inverter according to the present invention, only the monitoring device and the electronic start control circuitry operate during standby. These devices draw extremely little power. Although the power section of the inverter is connected to the input voltage, no current is drawn as the semiconductor valves are not addressed. In inverters, having commutating devices which depend on the input d-c voltage, the power section is ready to start immediately. In inverters, having commutating arrangements which depend on the load current, it is advisable to pre-charge the commutation circuit, as is described in U.S. application Ser. No. 617,157, now U.S. Pat. No. 4,058,738. Such known pre-charging arrangements for commutating circuits likewise show only a small energy consumption in standby operation. The required switching means are advantageously designed so that no current is drawn in standby operation. For this purpose, switching devices with remanence behavior can be chosen or the switching means can be designed so that the switching devices are in the non-energized or dropped-off state in standby operation.

Upon a start command, the control arrangement of the inverter is connected to its supply voltage. The control unit influenced by the start control logic immediately generates firing pulses such that the output voltage of the inverter begins with the same parameters which the network voltage exhibited at the instant of the disturbance. This creates neither voltage nor phase jumps at the load. The inverter is brought into operation so fast that the load is supplied, for all practical purpose, without interruption.

For determining the parameters of the network voltage and for storing at the instant of the disturbance, analog or digital means can be employed. As analog storing means are suited in particular capacitors or sample-and-hold circuits. As binary or digital memories, core memories, semiconductor memories, plasma discharge paths, glow lamps or cold cathode tubes can be used.

The present invention can be used particularly to start an inverter with the correct phase relative to the network. For this purpose, the phase of the network voltage is monitored and stored in the event of a disturbance. The output voltage of the inverter begins with the stored phase of the network voltage at the instant of the disturbance. The phase of the network voltage can be determined with phase angle measuring devices which are based on analog, binary or digital operating principles. In one particularly advantageous possibility, a counter is provided which is triggered by the zero crossings of the monitored network voltage, or by a quantity derived from the monitored network voltage, such as its differential quotient or its time integral.

An inverter according to the present invention can be used particularly in protected power supply systems. Another application is strengthening weak systems, where, for instance, series and/or shunt transformers may be provided for controlling the energy flow. Also in this application, it is important that the inverter generate an output voltage having parameters which agree with the monitored network voltage as quickly as possible. Another application for an inverter according to the present invention is to supply electric motor drives. There are applications, for instance, in drives for glass drawing machines, in which a normal three phase motor must be run at a highly constant speed. The supply of the drive must therefore be kept free of breaks in the line voltage.

BRIEF DESCRIPTION OF THE DRAWINGS

FIG. 1 is a block diagram of a protected power supply system with an inverter according to the present invention.

FIG. 2 is a basic circuit diagram of a start control logic circuit operating by analog means.

FIG. 3 is an illustration, in principle, of a connection, performed by the start control logic, of the supply voltage for the control unit of the inverter.

DETAILED DESCRIPTION OF THE INVENTION

Figure 4:
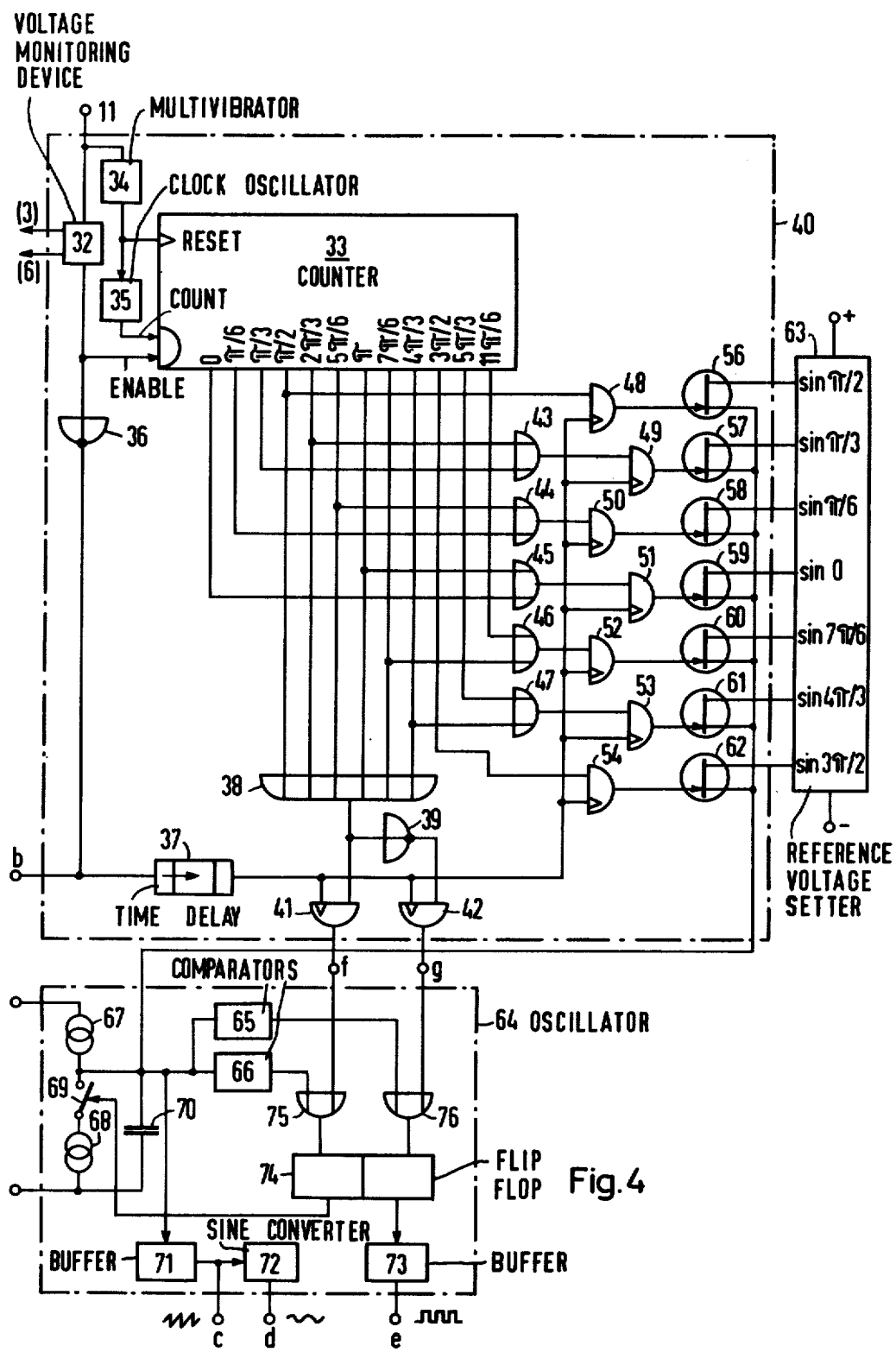
FIG. 4 is a basic circuit diagram of a start control logic circuit operating with digital means.

As an example of an application, FIG. 1 shows the use of an inverter according to the present invention in a protected power supply system. In normal operation, a load 1 is supplied via a preceding filter 2 and a system switch 3 from a single or three phase network 4. For emergency operation, a static inverter 5 is provided, which is connected via an inverter switch 6 and is connected on the input side to a battery 7, which is charged or kept under trickle charge by a charging rectifier 9. With the inverter 5 is associated a control device 8 with a control unit for generating firing pulses to its controlled semiconductor valves. The control device 8 is connected to the battery 7 via the supply voltage regulator 77. There is further provided a monitoring device 10, to which a tap 11 for voltage and synchronization for the network 4 is connected on the input side. The monitoring device 10 monitors the network voltage and, upon an undue deviation, generates control signals for switching means as well as, at the terminal a, a signal for the control unit in the control device 8 of the inverter 5 in order to start the inverter with the correct phase.

In normal operation, with the network voltage intact, the load 1 is supplied directly from the single or three phase network 4. The network switch 3 is closed. If a contactor is provided as the network switch, it is preferably connected so that it is in the dropped-off condition in normal operation and its magnet coil is not energized. A contactor with remanence behavior may also be provided. The inverter 5 is in a standby condition, in which its semiconductor valves are not addressed by firing pulses and its control device 8 is likewise not connected to its supply voltage. The inverter switch 6 can therefore likewise be closed. If a contactor is provided as the inverter switch 6, then it is advantageously likewise employed so that it is in the dropped-off condition in the standby position. The battery 7 is kept under trickle charge by the charging rectifier 9. The monitoring device 10 is in operation and continuously monitors the voltage of the network 4. Upon an undue deviation of the network voltage, the monitoring device 10 switches the load 1 to an emergency power supply via the inverter 5. For this purpose, the network switch 3 is opened and the inverter 5 is started in such a manner that its output voltage begins with the same parameters at which the network had been operating before being disturbed, particularly with the same phase.

If the network voltage has regained its normal value after the network disturbance has been corrected and remains for a certain time without disturbance, then the monitoring device 10 causes a return to normal operation with supply from the network 4. For this purpose, the network switch 3 is closed and the inverter switch 6 is opened. The inverter and its control device are shut down. Thereupon, the inverter switch 6 can be closed again. The battery is charged via the charging rectifier 9. Since in public power systems only brief disturbance need to be expected, the charging rectifier 9 need not be designed for the full load power rating. It can rather be assumed that enough time is available for recharging the battery 7 and the charging rectifier 9 can be made accordingly small.

For energy storage for emergency operation, a fuel cell arrangement or a capacitor arrangement, for instance, can also be provided besides a battery. It is also possible to use the inverter only long enough for supplying the load until another emergency power set is ready for use, for instance, until a turbine or a Diesel unit has been started up or a fly-wheel unit has been connected up.

The interruption free power supply system shown is distinguished by exceedingly good efficiency in normal operation. If the load is supplied from the system network, there is no energy transformation accompanied by losses of any kind. The power section of the inverter is shut down. No losses and noise are produced in the commutating circuits of the inverter, especially not in transformers and chokes. Since the control device of the inverter is also not in operation, no losses accrue there either. The power consumption of the monitoring device 10, which is running during standby operation, can be kept extremely small if it is constructed from electronic components, particularly if integrated circuits are used.

Customarily, the control device of an inverter contains a voltage regulator, which starts up relatively slowly because of an integrated component in the time behavior. The effect of the starting time of regulating device can be eliminated if control devices are used which are described in U.S. Pat. No. 4,020,360. The power consumption of such co-regulated control devices is also small. These losses can also be avoided if a control arrangement according to U.S. Pat. No. 4,020,360 is used. If this control arrangement is added into the circuit, there are no time dependent processes, since the energy storage devices such as the capacitor in the feedback path of the voltage regulator, are discharged in standby operation. After its supply voltage is applied, this known regulating device is operative within milliseconds. A particularly simple possibility for loss free standby operation of the regulating device is to first take off a voltage reference value from a potentiometer which is connected to a supply voltage upon a start command. Switching to the output voltage thereof takes place only after the regulating device has been started up and has reached its steady state.

In the power supply system according to FIG. 1, a brief interruption of the supply at the input of the filter 2 can occur due to the opening of the network switch 3 when switching from normal operation to emergency operation. Brief interruptions can also occur at the filter input due to transients when switching back from emergency operation to normal operation. For many consumers, such brief interruptions are permissible. On the other hand, there are also applications, in which even interruptions which are within the switching time of contactors, are not permissible. In these cases, an interruption of the feeding to the consumer can be avoided if the filter supplies energy to the load during the switching process. With appropriate design of the filter elements, possibly including energy storing elements in the load itself such as impedances, the supply to the load can be guaranteed so that the voltage deviations permissible for it are observed. As the filter 2, a bandpass filter can be used, in particular, which normally follows an inverter for filtering its squarewave output voltage in order to obtain a sinusoidal voltage. The filter 2 therefore does not represent additional costs. Due to its arrangement between the switching devices and the load, the filter 2 always precedes the load 1. In normal operation, it attenuates low and high frequency disturbances on the line voltage. When switching from normal operation to emergency operation and back, the filter acts as a short term energy storage device. In emergency operation via the inverter, it filters the output voltage of the latter. As these requirements are not contradictory, it is possible to design filter elements appropriately.

As will be explained in detail later on, the inverter 5 can be started and brought to delivery of power in a very short time. It is therefore advantageous to provide a fast opening switch as the network switch 3. Such as fast switching device is described in U.S. Pat. No. 3,999,078. However, it is, in particular, also possible to provide semiconductor switches as the network switch 3 and the inverter switch 6, respectively, which are equipped, for instance, with thyristors, triacs or ignitrons.

FIG. 2 shows an embodiment of a monitoring device 10 with a start control logic operating with analog voltages. The voltage and synchronization tap 11 is connected to the input of device 10. The measured voltage value acts on a voltage monitoring device 12, which can be designed, for instance, with limit indicators, the response values of which correspond to the permissible voltage variations for the load. It is, in particular, also possible to provide a voltage monitoring device according to U.S. application Ser. No. 808,527, by means of which undue deviations of the line voltage can be detected and converted into a corresponding signal very fast. It is furthermore possible to provide a voltage monitoring device which responds to undue deviations of the frequency of the monitored system or which responds to jumps in the phase of the system voltage. The voltage monitoring device 12 generates control commands for the network stitch 3 and the inverter switch 6. A suitable monitoring device is described in U.S. Pat. No. 3,999,078. For the description of the present invention it is important only that the voltage monitoring device 12 generates a trouble signal at its output terminal b.

The measured voltage taken off at the voltage and synchronization tap represents a synchronizing signal, which is fed to a first integrator 101 and a second integrator 103. The first integrator contains an operational amplifier 15, the feedback path of which includes a capacitor 16. The capacitor 16 is shunted by a high resistance resistor 17 for stabilization. The non-inverting input of the operational amplifier 15 is connected to ground via a balancing resistor 18. An electronic switch 19, which can be realized by an FET transistor, for instance, is connected between the two input resistors 13a and 13b which are connected in series with the inverting input. The control terminal of the electronic switch 19 is connected to the output terminal b of the voltage monitoring device 12. A disturbance signal of the voltage monitoring device 12 switches the switch 19 into conduction and thereby short-circuits the input voltage for the first integrator. The first integrator then retains its instantaneous voltage value.

The second integrator is similarly constructed of an operational amplifier 21 and a feedback capacitor 22 as well as the high resistance resistors 23 and 24 and input resistors 20a and 20b in series. Between the two input resistors 20a and 20b, a further electronic switch 14 is connected, which may again be an FET transistor. The control terminal of the further electronic switch 14 is likewise connected to the output terminal b of the voltage monitoring device 12. A disturbance signal switches the switch 14 into conduction and thereby short-circuits the input voltage for the second integrator. The second integrator then retains its instantaneous voltage value.

The output of the second integrator is brought to the terminal a via an electronic switch 25, for instance, again an FET transistor. The control terminal of the electronic switch 25 is connected to the output terminal b of the voltage monitoring device 12. Upon a disturbance signal, the switch 25 is switched into conduction. The terminal a of the monitoring device 10 is connected to the time determining capacitor 26 of the oscillator 27 in the control unit. An Intersil 8038 voltage controlled oscillator can be used as an oscillator for instance, which is manufactured as an integrated circuit.

If in normal operation, the inverter is in the standby position, a sinusoidal synchronizing signal, taken from the line 4, is present at the input of the first integrator. The first integrator forms an inverted cosine signal therefrom, which is transformed by the second integrator into a sine signal again. Upon a disturbance signal from the voltage monitoring device 12, the input voltages of the two integrators are short-circuited. Both integrators retain their instantaneous output voltages. The first integrator stores the time integral of the synchronizing signal, which in the case of sinusoidal variables gives at the same time the differential quotient and thereby, the direction of the change. The second integrator stores the amplitude and the phase of the synchronizing signal at the instant of the disturbance. The output voltage of the second integrator and therefore, the stored information as to the amplitude and the phase of the network at the disturbance is fed to the time determining capacitor 26 of the oscillator 27 in the control unit via the switch 25, which is switched into conduction. If the operational amplifier 21 of the second integrator can drive a very large output current, say, 1 A, then the time determining capacitor 26 of the oscillator 27 is charged very quickly to the output voltage of the second integrator. The charging can be accomplished in a time which is very short relative to a period of the line voltage.

As will be explained later on, the entire control device of the inverter is connected to its supply voltage by the disturbance signal. The oscillator 27 of the control unit begins to operate. The direction of the oscillation of the oscillator 27 is determined by the differential quotient of the synchronizing signal. To this end, the output voltage of the first integrator 101 is fed to a polarity detector 29, the output signal of which changes in accordance with the polarity of the time integral of the synchronizing signal. The output signal of the polarity detector 29 is passed on to the oscillator 27 via a logic circuit 28. The logic circuit 28 includes an inverter and two AND gates which are enabled by the disturbance signal at the terminal b of the voltage monitoring device 12.

FIG. 3 shows schematically how the supply voltage for the control device 8 is connected up upon a disturbance signal. The control device 8 is connected via a supply voltage regulator 30 to the same d-c voltage source 7 to which also the inverter is connected. The supply voltage regulator 30 is provided for stabilizing the supply voltage of the control electronics. A National Semiconductor voltage regulator Type LM 340 can be used, for instance. To the control terminal of the supply voltage regulator 30 is connected an electronic switch 31, e.g., a transistor, the control electrode of which is connected via an input resistor to the output terminal b of the voltage monitoring device 12. As soon as the voltage monitoring device generates a disturbance signal at its terminal b the switch 31 is switched into conduction. The supply voltage regulator 30 is driven and applies a regulated supply voltage to the control device 8.

FIG. 4 shows an embodiment of a monitoring device 40 with a start control logic operating with digital means which can be used in place of device 10 of FIG. 1. The monitoring device 40 again has its input connected to the voltage and synchronization tap 11 for the monitored network. The measured voltage is fed to a voltage monitoring device 32 which responds to undue deviations of the amplitude and/or frequency and/or phase of the monitored network and generates positioning signals for the network switch 3 and the inverter switch 6. In the description of this embodiment, it will be assumed that the voltage monitoring device 32 generates a logical "1" signal if the monitored network voltage is intact. If there is a disturbance of the network, the output signal changes into a "0" signal. The output signal of the voltage monitoring device 32 is inverted in an inverter 36 and is again available at the terminal b for connecting up the supply voltage for the control device 8, as was described already in connection with FIG. 3.

The start control logic contains a counter 33, in the counting input of which an AND operation of the output signal of the voltage monitoring device 32 with the counting pulses from an oscillator 35 is performed. The oscillator 35 generates a pulse frequency which is an integral multiple of the monitored network frequency. For the description of the illustrated embodiment, it will be assumed that the network frequency is 50 Hz and that the oscillator 35 generates a pulse frequency of 600 Hz. One period of the oscillator thus corresponds to 1/12 of the network period. The oscillator 35 is synchronized with the monitored network. For this purpose, a multivibrator 34 is provided, the output signal of which changes with the polarity of the network voltage. At every zero crossing of the network voltage from the negative to the positive half-wave, the counter 33 is reset by the rising flank in the output signal of the multivibrator 34 and the oscillator 35 synchronized.

The basic idea of the arrangement shown with the counter 33 and the oscillator 35 is to divide a full wave oscillation into twelve sections. For this purpose, the pulse frequency of the oscillator 35 is twelve times that of the network voltage. Each of these twelve sections corresponds to a phase range of $\pi/6$. As long as the monitored network is intact and the voltage monitoring device 32 generates a "1" signal, a counting pulse is generated by the oscillator 35 for each of these phase ranges and fed to the counter 33. If a disturbance is indicated by the voltage monitoring device 32, the counting input of the counter 33 is blocked i.e. disabled. The counter remains at the number of the previously reached phase section. The start control logic now insures that the oscillator in the control unit of the inverter is started with this phase range.

In the illustrated embodiment, the oscillator 64 is an Intersil voltage-controlled oscillator Type ICL 8038. The oscillator 64 contains two comparators 65 and 66 which monitor the voltage at the frequency determining capacitor 70. The capacitor 70 is charged in accordance with the position of an electronic switch 69 either from a current source 67 or from a current source 68. Always when the charging voltage of the capacitor 70 reaches an upper or a lower limit, respectively, the flipflop 74 is switched and the switch 69 switched by the output signal of the former. The charging voltage of the capacitor 70 has a triangular waveshape, which can be taken off behind a buffer 71 at the terminal c. This triangular voltage is converted, by a sine converter 72, into a sinusoidal voltage, which is present at the terminal d. The triangular voltage at the terminal c and the sine voltage at the terminal d are fed to the control unit of the inverter. The output voltage of the flipflop 74 is a square wave, which can be taken off behind a further buffer 73 at the terminal e.

So that the oscillation of the oscillator 64 can begin in the same phase range in which the disturbance signal for the network voltage occurred, the time determining capacitor 70 is charged to a corresponding voltage value which is generated by a reference voltage setter 63. In addition, provision is made that the incipient charging current for the capacitor 70 has the correct polarity. For this purpose, the memory e.g. flipflop 74 is set via the terminals f and g so that the electronic switch 69 connects up the corresponding current source 67 or 68 as the first one. The inputs of the flipflop 74 are connected for this purpose via the OR gates 75 and 76 and via AND gates 41 and 42 to the output of an OR gate 38. The inputs of the OR gate 38 are connected to those counter outputs of the counter 33 which indicate phase ranges with a negative differential quotient of the network voltage, i.e., the phase ranges from $\pi/2$ to $4\pi/3$. The output signal of the OR gate 38 is inverted in an inverter 39. The output signal of the OR gate 38 and the inverter output signal are fed to the AND gates 41 and 42, the enabling inputs of which are connected via a time delay member 37 to the output of the voltage monitoring device 32. If a disturbance signal occurs, the flipflop 74 is therefore set correctly.

The reference voltage setter 63, which is connected to a positive and a negative potential, contains, for instance, a chain of resistors or Zener diodes which are chosen so that voltages are generated at the outputs, which are associated with the mentioned phase ranges of a sine wave at the output d of the oscillator 64. The corresponding output voltages are indicated at the outputs of the reference voltage setter 63. One of these output voltages is connected through to the time determining capacitor 70 in the oscillator 64 via one of the electronic switches 56 to 62. The electronic switches 56 to 62 are addressed by respective AND gates 48 to 54. The AND gates 48 to 54 link the output signals of OR gates 43 to 47 with the disturbance signal of the voltage monitoring device 32, which is fed via the time delay member 37. The delay member 37 takes into consideration the time which is required for the power supply of the control electronics to build up. The inputs of each of the OR gates 43 through 47 are connected to two outputs of the counter 33, with which symmetrical phase ranges of a sine wave are associated.

The start control logic shown operates as follows:

As long as the network is intact, the counter 33 is addressed on the input side by counting pulses of the oscillator 35. The outputs of the counter are set successively from a "1" signal to "0" signal and subsequently cancelled again. The output signals of the counter 33 are prevented from reaching switches 56–62 by the AND gates 41, 42 and 48 to 54 which are not enabled. If a disturbance signal appears, the input of the counter 33 is blocked. The outputs of the counter retain their instantaneous signal states. Let us assume that the disturbance signal for the network voltage occurred at a phase of the network voltage of 50°. Then, the second output of the counter 33, labelled $\pi/6$, carries a "1" signal. The latter is fed via the OR gate 44 to the AND gate 50 and is connected through to the control path of the switch 58 with the rising flank of the output signal of the time delay member 37. Via the conducting switch 58, the reference voltage designated with $\pi/6$ gets to the time determining capacitor 70. In addition, the flipflop 74 is set via the OR gate 38 and the two AND gates 41 and 42 in such a manner that the further charging current for the capacitor 70, which starts from one of the two current source 67 or 68, charges the latter in the direction toward higher voltage.

In standby operation, only the monitoring device 40 with the start control logic is operative. The reference voltage setter 63, the oscillator 64 as well as the further information and power electronics of the control device are not connected to the supply voltage. Only when a disturbance signal occurs, are these subassemblies connected to their supply voltage in the manner explained in connection with FIG. 3.

Subdividing a full sine wave into successive phase regions makes possible particularly advantageous solutions for pulsed inverters if the number of the phase regions is twice the number of pulses.

What is claimed is:

1. In an inverter adapted for alternating standby or load operation, which comprises a power section with controlled main valves and a control device with a control unit having an oscillator with a time determining capacitor for forming firing pulses and a monitoring device for a single or three phase network for generating a disturbance signal and forming a start command upon sensing a disturbance, the improvement comprising start control logic means coupled to be operative in standby operation, said start control logic having an input coupled to sense at least one parameter of the monitored network voltage and including a memory for storing said at least one parameter of the network voltage in the event of a disturbance and means to charge the time determining capacitor of said oscillator, in dependence on the value stored in said memory, to a voltage which will cause the control unit to deliver firing pulses to the control valves in the power section of the inverter, upon occurrence of the disturbance signal, in such a manner that the firing pulses supplied to said power section cause it to have an output voltage when it begins operating which corresponds to the stored parameter of the network voltage at the instant of the disturbance.

2. The improvement according to claim 1, wherein the phase, amplitude and frequency of the network voltage are used as the sensed and stored parameters of the network voltage.

3. The improvement according to claim 1, wherein said start control logic comprises:
   (a) an oscillator which is synchronized with the monitored network voltage and the pulse frequency of which is an integral multiple of the network voltage,
   (b) a counter which is addressed by counting pulses from said oscillator,
   (c) means for stopping said counter in response to said disturbance signal,
   (d) a reference voltage setter,
   (e) means for addressing said reference voltage setter, with said count, and
   (f) means for coupling a reference voltage from said reference voltage setter for charging said time determining capacitor the oscillator of the control unit of the control device.

4. The improvement according to claim 1, wherein said start control logic means comprises:
   (a) a first integrator having as an input a synchronizing signal obtained by measuring the voltage in said network;
   (b) a second integrator having as an input the output of said first integrator; and
   (c) a switch controlled by said disturbance signal coupling the output voltage of the second integrator to said time determining capacitor whereby said time determining capacitor, upon operation of said switch will be charged to the output voltage of said second integrator, said second integrator storing information concerning the amplitude and phase of the network at the time of disturbance.

5. A method for setting an inverter adapted for alternating standby or load operation, which comprises a power section with controlled main valves and a control device with a control unit for forming firing pulses and a monitoring device for sensing a distrubance in a single or three phase network and generating a disturbance signal and forming a start command, in operation with the correct phase comprising:
   (a) providing start control logic means coupled to be operative in standby operation, said start control logic having an input coupled to sense at least one parameter of the network voltage and including a memory for storing said at least one parameter of the network voltage in the event of a disturbance and means to charge the time determining capacitor of said oscillator, in dependence on the value stored in said memory, to a voltage which will cause the control unit to deliver firing pulses to the control valves of the inverter upon occurrence of the disturbance signal in such a manner that the firing pulses supplied to said power section to cause it to have an output voltage when it begins operating which corresponds to the stored parameter of the network voltage at the instant of the disturbance;

(b) during standby operation operating the monitoring device and the start control logic but maintaining the power section shut down and the control electronics of the inverter disconnected from its supply voltage; and (c) in the event of an undue deviation of the monitored network voltage operating said means to charge and setting the power section and the control electronics of the inverter into operation, whereby because of the voltage at said time determining capacitor the inverter will begin with an output voltage equal to the network voltage which was being sensed at the time of the disturbance.

* * * * *